United States Patent
Lee

(10) Patent No.: US 11,878,417 B2
(45) Date of Patent: Jan. 23, 2024

(54) ROBOT, METHOD OF CONTROLLING SAME, AND SERVER FOR CONTROLLING SAME

(71) Applicant: LG ELECTRONICS INC., Seoul (KR)

(72) Inventor: Wonhee Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 268 days.

(21) Appl. No.: 16/913,504

(22) Filed: Jun. 26, 2020

(65) Prior Publication Data

US 2021/0229274 A1 Jul. 29, 2021

(30) Foreign Application Priority Data

Jan. 23, 2020 (KR) .................. 10-2020-0009100

(51) Int. Cl.
- *G05D 1/00* (2006.01)
- *B25J 9/16* (2006.01)
- *B25J 19/02* (2006.01)

(52) U.S. Cl.
CPC ............. *B25J 9/163* (2013.01); *B25J 9/162* (2013.01); *B25J 9/1651* (2013.01); *B25J 19/023* (2013.01); *G05D 1/0022* (2013.01)

(58) Field of Classification Search
CPC . B25J 19/023; B25J 5/007; B25J 9/161; B25J 9/162; B25J 9/163; B25J 9/1651; G05D 1/0022; G05D 1/0282; G05D 2201/0216
See application file for complete search history.

(56) References Cited

U.S. PATENT DOCUMENTS

| | | | |
|---|---|---|---|
| 2016/0259342 A1* | 9/2016 | High | B62B 5/0026 |
| 2017/0259753 A1* | 9/2017 | Meyhofer | H04N 13/204 |
| 2020/0264626 A1* | 8/2020 | Wang | G05D 1/0246 |
| 2020/0293049 A1* | 9/2020 | De Castro | G01C 21/206 |
| 2020/0368913 A1* | 11/2020 | Scott | G01N 35/00871 |
| 2021/0163021 A1* | 6/2021 | Frazzoli | B60W 50/02 |
| 2021/0372796 A1* | 12/2021 | Lin | G01C 21/20 |
| 2022/0190941 A1* | 6/2022 | Kudo | H04W 16/28 |

* cited by examiner

*Primary Examiner* — Jeff A Burke
*Assistant Examiner* — Zachary Joseph Wallace
(74) *Attorney, Agent, or Firm* — KED & ASSOCIATES, LLP

(57) ABSTRACT

The embodiments relate to a robot and a server communicating with the robot, the robot being driven by using at least one among a driving wheel, a propeller, and a manipulator moving at least one joint.

18 Claims, 15 Drawing Sheets

ROBOT, METHOD OF CONTROLLING SAME, AND SERVER FOR CONTROLLING SAME

CROSS-REFERENCE TO RELATED APPLICATION

This application claims priority under 35 U.S.C. § 119 to Korean Application No. 10-2020-0009100 filed on Jan. 23, 2020, whose entire disclosure is hereby incorporated by reference.

BACKGROUND

1. Field

The present disclosure relates to a robot, a method of controlling the robot, and a server for controlling the robot.

2. Background

Robots have been developed for industrial use and have undertaken part of factory automation. In recent years, the field of application of robots has been further expanded, medical robots, aerospace robots, and the like have been developed, and home robots that may be used in general homes have been manufactured.

In recent years, a cloud-based robot control method has been developed. In the cloud-based robot control method, a server processes sensor data received from a robot, and transmits a control command according to a result of processing the sensor data, to the robot. The robot performs an operation according to the control command received from the server. The robot is not equipped with a large-size processor performing complex operations, so that the size and the manufacturing costs may be reduced.

In order to prevent an accident caused by malfunction of the robot, in the cloud-based robot control method, a stable communication environment between the robot and the server needs to be ensured. However, in a general communication environment, the communication performance changes in real time so a method of controlling the robot in safety when the communication performance is poor is required. The foregoing is intended merely to aid in the understanding of the background of the present disclosure, and is not intended to mean that the present disclosure falls within the purview of the related art that is already known to those skilled in the art

BRIEF DESCRIPTION OF THE DRAWINGS

The embodiments will be described in detail with reference to the following drawings in which like reference numerals refer to like elements wherein.

DETAILED DESCRIPTION

Figure 1:
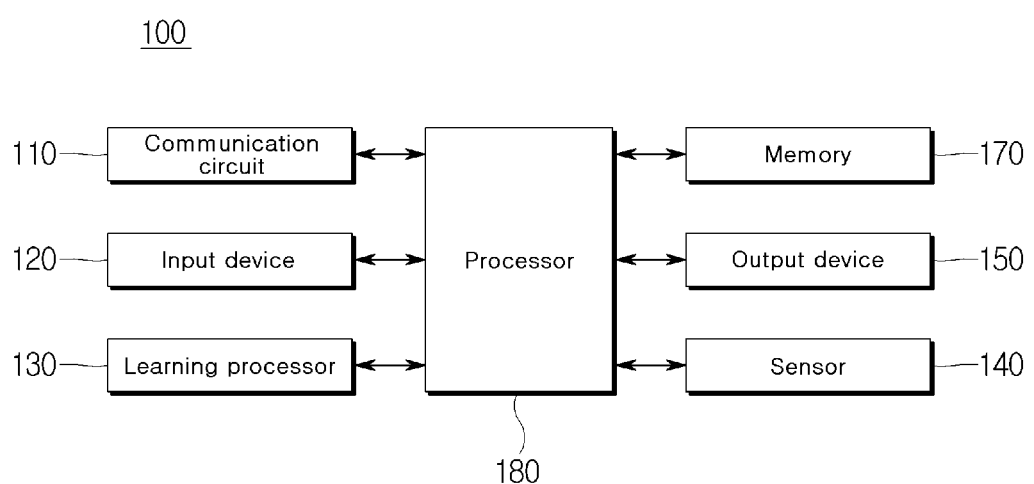
FIG. 1 is a diagram showing an AI apparatus according to an embodiment.

Artificial intelligence refers to the field of researching artificial intelligence or the methodology to create the same, and machine learning refers to the field of defining various problems in the field of artificial intelligence and researching the methodology for solving the problems. Machine learning is defined as an algorithm that improves the performance of an operation by performing a consistent experience for the operation.

An artificial neural network (ANN) is a model used in machine learning, and may refer to an overall model having a problem-solving ability, which is composed of artificial neurons (nodes) constituting a network through synaptic coupling. The artificial neural network may be defined by the followings: a connection pattern between neurons in different layers; a learning process of updating a model parameter; and an activation function generating an output value.

The artificial neural network may include an input layer, an output layer, and optionally one or more hidden layers. Each layer may include one or more neurons, and the artificial neural network may include a synapse that connects neurons. In the artificial neural network, each neuron may output a function value of an activation function for input signals input through a synapse, a weight, and a bias.

The model parameter refers to a parameter determined through learning, and includes a weight of a synapse connection, a bias of a neuron, and the like. In addition, a hyper-parameter refers to a parameter that needs to be set in a machine learning algorithm before performing learning, and includes a learning rate, the number of times for repetition, a size of a mini-batch, an initialization function, and the like.

An objective of performing learning for an artificial neural network is to determine a model parameter that minimizes a loss function. The loss function may be used as an index for determining an optimum model parameter in a learning process of the artificial neural network. Machine learning may be classified into supervised learning, unsupervised learning, and reinforcement learning according to a learning method.

Supervised learning may refer to a method of performing learning for an artificial neural network where a label related to learning data is provided. The label may refer to a right answer (or result value) that should be estimated by the artificial neural network when the learning data is input to the artificial neural network. Unsupervised learning may refer to a method of performing learning for an artificial neural network where a label related to learning data is not provided. Reinforcement learning may refer to a method of performing learning so that an agent defined under a particular environment selects an action or a sequence of actions to maximize an accumulated reward in each state.

Machine learning implemented in a deep neural network (DNN) including multiple hidden layers, among artificial neural networks, is referred to as deep learning, and the deep learning is a part of the machine learning. Hereinafter, machine learning is used as including deep learning.

A robot may refer to a machine capable of automatically carrying out or performing a given operation by its own ability. Particularly, a robot having a function of recognizing an environment, and performing an operation by performing determination by itself may be referred to as an intelligent robot.

A robot may be classified into an industrial type, a medical type, a household type, a military type, and the like according to the usage purpose or field. The robot may be provided with a manipulator including an actuator or motor so that the robot may perform various physical operations such as moving a robot joint, and so on. In addition, a movable robot may drive on the ground or fly in the air, including a wheel, a brake, a propeller, and the like.

Self-driving refers to the technology of autonomous driving, and a self-driving vehicle refers to a vehicle that drives without user's manipulations or with the minimal manipulation of the user. For example, self-driving may include the technique of maintaining a driving lane, the technique of automatically adjusting a speed such as adaptive cruise control, the technique of automatically driving along a predetermined route, the technique of automatically setting a route when a destination is set, and so on.

Vehicles may include a vehicle with only an internal combustion engine, a hybrid vehicle with an internal combustion engine and an electric motor together, and an electric vehicle with only an electric motor, and may include not only automobiles but also trains, motorcycles, and the like. Herein, a self-driving vehicle may be referred to as a robot having a self-driving function.

Extended reality refers to virtual reality (VR), augmented reality (AR), and mixed reality (MR). The VR technique provides objects and backgrounds of the real world only as CG images, the AR technique provides virtual CG images on images of real objects, and the MR technique is a computer graphic technique mixing and coupling virtual objects in the real word.

The MR technique is similar to the AR technique in that real objects and virtual objects are shown together. However, in the AR technique, virtual objects are used to complement real objects, while in the MR technique, virtual objects and real objects are equivalently used.

The XR technique may be applied to a head-mount display (HMD), a head-up display (HUD), a mobile phone, a tablet PC, a laptop PC, a desktop PC, a TV, a digital signage, and the like. A device to which the XR technique is applied may be referred to an XR device.

FIG. 1 is a diagram showing an AI apparatus according to an embodiment. The AI apparatus 100 may be implemented as a fixed or movable apparatus such as a TV, a projector, a mobile phone, a smartphone, a desktop PC, a laptop PC, a digital broadcasting terminal, a PDA (personal digital assistant), a PMP (portable multimedia player), a navigation device, a tablet PC, a wearable device, a set-top box (STB), a DMB receiver, a radio, a washing machine, a refrigerator, a digital signage, a robot, a vehicle, and the like.

Referring to FIG. 1, the AI apparatus 100 may include a communication circuit 110, an input device 120, a learning processor 130, a sensor 140, an output device 150, a memory 170, and a processor 180. The communication circuit 110 may transmit and receive data from other AI apparatuses 100a to 100e or external devices such as an AI server 200 by using a wired/wireless communication technology. For example, the communication circuit 110 may transmit and receive sensor information, a user input, a learning model, a control signal, and the like, from external devices.

Herein, communication technologies used by the communication circuit 110 include the Global System for Mobile Communication (GSM), code-division multiple access (CDMA), Long-Term Evolution (LTE), 5G, wireless LAN (WLAN), Wi-Fi, Bluetooth™, radio-frequency identification (RFID), Infrared Data Association (IrDA), ZigBee, near-field communication (NFC), and the like.

The input device 120 may acquire various types of data. Herein, the input device 120 may include a camera for an image signal input, a microphone for receiving audio signals, and a user input unit for receiving information from the user. Herein, signals acquired from the camera or microphone by using the same as a sensor may be referred to as sensing data or sensor information.

The input device 120 may acquire input data that is used for outputting using learning data for model learning and a learning model. The input device 120 may acquire input data that is not processed. Herein, the processor 180 or learning processor 130 may acquire an input feature from the input data as preprocessing.

The learning processor 130 may perform learning for a model configured with an artificial neural network by using learning data. Herein, the artificial neural network for which learning is performed may be referred to as a learning model. The learning model may be used for estimating a result value for new input data other than learning data, and the estimated value may be used as the basis for determination to perform a particular operation.

Herein, the learning processor 130 and a learning processor 240 of the AI server 200 may perform AI processing. Herein, the learning processor 130 may be integrated in the AI apparatus 100 or may include a memory implemented therein. Alternatively, the learning processor 130 may be implemented by using the memory 170, an external memory directly connected to the AI apparatus 100, or a memory maintained in an external device.

The sensor 140 may acquire at least one among internal information of the AI apparatus 100, surrounding environment information of the AI apparatus 100, and user information. Herein, the sensor 140 may be configured as one of the following or a combination of several thereof: a proximity sensor, an ambient light sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and the like.

The output device 150 may generate an output related to visual, auditory, or tactile sense. Herein, the output device 150 may include a display for visually outputting information, a speaker for auditorily outputting information, a haptic actuator for tactually outputting information, and the like.

For example, the display may output an image or video, the speaker may output a voice or sound, and the haptic actuator may output vibration.

The memory 170 may store data supporting various functions of the AI apparatus 100. For example, in the memory 170, the input data acquired through the input device 120, learning data, a learning model, a learning history, and the like may be stored.

The memory 170 may include at least one storage medium among the following: a flash memory type, a hard disk type, a multimedia card micro type, a card-type memory (for example, SD, XD memory, or the like), a magnetic memory, a magnetic disk, an optical disc, random-access memory (RAM), static random-access memory (SRAM), read-only memory (ROM), programmable read-only memory (PROM), and electrically erasable programmable read-only memory (EEPROM).

The processor 180 may determine at least one executable operation of the AI apparatus 100 which is determined on the basis of information determined or generated by using a data analysis algorithm or machine learning algorithm. In addition, the processor 180 may perform the determined operation by controlling the elements of the AI apparatus 100.

To this end, the processor 180 may make a request, retrieve, receive, or use data of the learning processor 130 or the memory 170, and may control the elements of the AI apparatus 100 so that a predicted operation or an operation determined to be preferable, of the at least one executable operation is performed. Herein, in order to perform the determined operation, the processor 180 may generate, when association with an external device is required, a control signal for controlling the external device, and may transmit the generated control signal to the external device.

The processor 180 may acquire intent information with respect to the user input, and may determine a user's requirement based on the acquired intent information. Herein, the processor 180 may acquire intent information corresponding to the user input by using at least one of the following: an STT (speech-to-text) engine converting a speech input into text strings, and a natural language processing (NLP) engine acquiring intent information of natural language.

Herein, at least a part of the at least one among the STT engine and the NLP engine may be configured with an artificial neural network for which learning is performed according to a machine learning algorithm. In addition, at least one among the STT engine and the NLP engine may be a result of performing learning by the learning processor 130, a result of performing learning by the learning processor 240 of the AI server 200, or a result of performing learning by distribution processing of the above processors.

The processor 180 may collect history information including the content of an operation of the AI apparatus 100, user's feedback on an operation, and the like so as to store the record information in the memory 170 or learning processor 130 or transmit the history information to the external device such as the AI server 200, and the like. The collected history information may be used in updating a learning model.

The processor 180 may control at least one or some of the elements of the AI apparatus 100 so as to execute an application program stored in the memory 170. Further, the processor 180 may operate a combination of at least two of the elements of the AI apparatus 100 so as to execute the application program.

Figure 2:
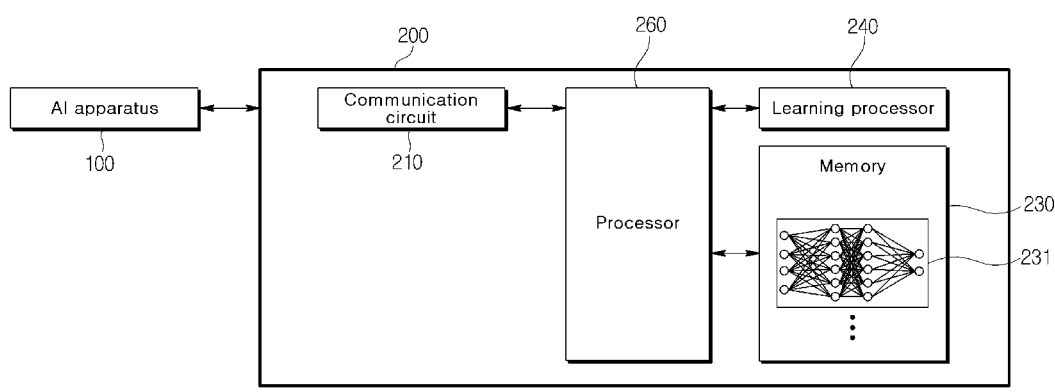
FIG. 2 is a diagram showing an AI server according to an embodiment.

FIG. 2 is a diagram showing an AI server according to an embodiment. Referring to FIG. 2, the AI server 200 may refer to an apparatus performing learning for an artificial neural network by using a machine learning algorithm, or an apparatus using the artificial neural network for which learning is performed. Herein, the AI server 200 may perform distributed processing by being configured with multiple servers, or may be defined as a 5G network. Herein, the AI server 200 may perform at least a part of AI processing by being included as a partial component of the AI apparatus 100.

The AI server 200 may include a communication circuit 210, a memory 230, a learning processor 240, and a processor 260. The communication circuit 210 may transmit and receive data from the external devices, such as AI apparatus 100, and the like. The memory 230 may store a model (or artificial neural network 231) for which learning is ongoing or performed by the learning processor 240.

The learning processor 240 may perform learning for an artificial neural network 231a by using learning data. A learning model may be used by being provided in the AI server 200 of the artificial neural network, or by being provided in the external device such as the AI apparatus 100, and the like.

The learning model may be implemented in hardware, software, or combination thereof. When a part or the entire of the learning model is implemented in software, one or more instructions constituting the learning model may be stored in the memory 230. The processor 260 may estimate a result value for new input data by using the learning model, and may generate a response or control command based on the estimated result value.

Figure 3:
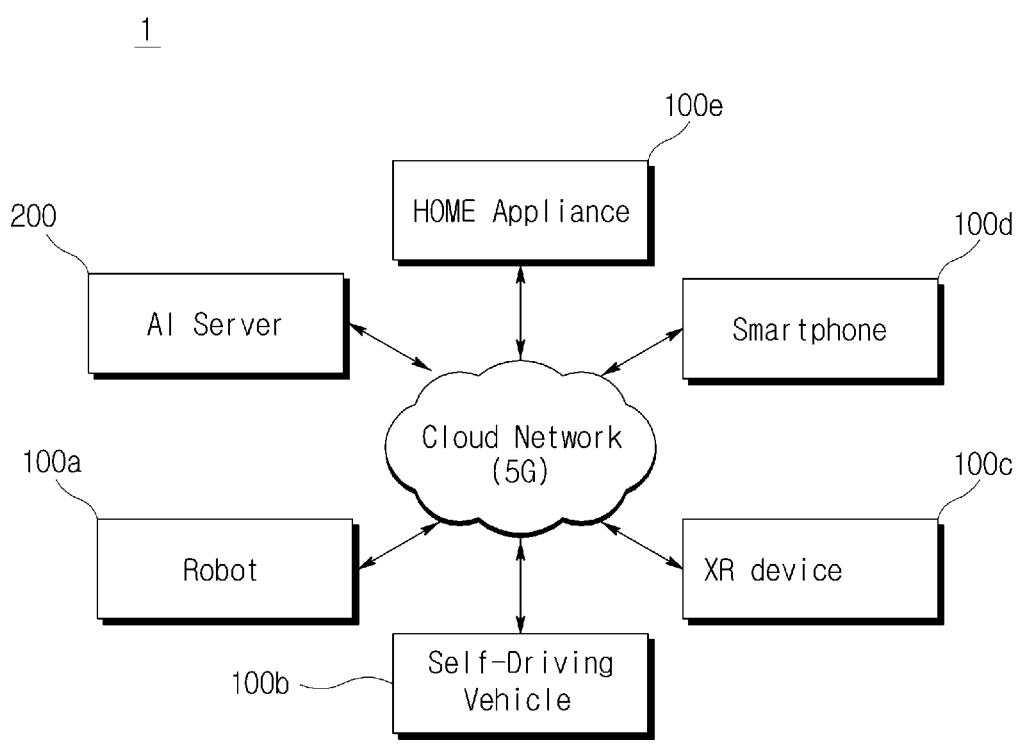
FIG. 3 is a diagram showing an AI system according to an embodiment.

FIG. 3 is a diagram showing an AI system according to an embodiment. Referring to FIG. 3, in the AI system 1, at least one among the AI server 200, a robot 100a, a self-driving vehicle 100b, an XR device 100c, a smartphone 100d, and a home appliance 100e is connected to a cloud network 10. Herein, the robot 100a, the self-driving vehicle 100b, the XR device 100c, the smartphone 100d, and the home appliance 100e to which the AI technique is applied may be referred to as the AI apparatuses 100a to 100e.

The cloud network 10 may refer to a network constituting a part of cloud computing infrastructure or a network present in the cloud computing infrastructure. Herein, the cloud network 10 may be configured by using a 3G network, a 4G or LTE network, a 5G network, or the like. In other words, the apparatuses 100a to 100e, and 200 constituting the AI system 1 may be connected with each other over the cloud network 10. Particularly, the apparatuses 100a to 100e, and 200 may communicate with each other through a base station, and also may communicate directly with each other without using the base station therebetween.

The AI server 200 may include a server performing AI processing, and a server performing operation for big data. The AI server 200 may be connected to at least one among the robot 100a, the self-driving vehicle 100b, the XR device 100c, the smartphone 100d, and the home appliance 100e, which are the AI apparatuses constituting the AI system 1, over the cloud network 10. The AI server 200 may help at least a part of the AI processing of the connected AI apparatuses 100a to 100e.

Herein, the AI server 200 may perform learning for an artificial neural network according to a machine learning algorithm in place of the AI apparatuses 100a to 100e. The AI server 200 may directly store a learning model, or may transmit the learning model to the AI apparatuses 100a to 100e.

Herein, the AI server 200 may receive input data from the AI apparatuses 100a to 100e, may estimate a result value for the received input data by using a learning model, and may generate a response or control command based on the estimated result value so as to transmit the result to the AI apparatuses 100a to 100e. Alternatively, the AI apparatuses 100a to 100e may estimate a result value for the received input data by directly using a learning model, and may generate a response or control command based on the estimated result value.

Hereinafter, various examples of the AI apparatuses 100a to 100e to which the above described technique is applied will be described. Herein, the AI apparatuses 100a to 100e shown in FIG. 3 may be referred to as detailed examples of the AI apparatus 100 shown in FIG. 1.

The robot 100a to which the AI technique is applied may be implemented as a guide robot, a transport robot, a cleaning robot, a wearable robot, an entertainment robot, a pet robot, an unmanned flying robot, and the like. The robot 100a may include a robot control module for controlling operations, and the robot control module may refer to a software module or a chip where the same is implemented in hardware.

The robot 100a may acquire state information of the robot 100a, may detect (recognize) a surrounding environment or object, may generate map data, may determine a moving path or driving plan, may determine a response to a user interaction, or may determine an operation, by using the sensor information that is acquired from various types of sensors. Herein, in order to determine the moving path or driving plan, the robot 100a may use the sensor information acquired from at least one sensor among a lidar, a radar, and a camera.

The robot 100a may perform the above operations by using a learning model configured with at least one artificial neural network. For example, the robot 100a may recognize a surrounding environment and an object by using a learning model, and may determine an operation by using the recognized surrounding environment information or object information. Herein, the learning model may be for learning directly performed by the robot 100a, or for learning performed by the external device, such as the AI server 200, and the like.

Herein, the robot 100a may generate a result by directly using the learning model so as to perform an operation. However, the robot 100a may transmit the sensor information to the external device such as the AI server 200, and the like, and may receive a result generated accordingly so as to perform an operation.

The robot 100a may determine a moving path and a driving plan by using at least one among map data, object information detected from the sensor information, and object information acquired from the external device, and may drive according to the determined moving path and the determined driving plan by controlling a driving unit. Map data may include object identification information on various objects arranged in a space where the robot 100a moves. For example, the map data may include object identification information on fixed objects such as a wall, a doors and the like, and movable objects such as a flowerpot, a table, and the like. In addition, the object identification information may include a name, a type, a distance, a position, and the like.

In addition, the robot 100a may perform an operation or drive by controlling the driving unit based on the user's control/interaction. Herein, the robot 100a may acquire intent information on interaction according to a user's motion or speech, and may determine a response based on the acquired intent information so as to perform an operation.

The self-driving vehicle 100b to which the AI technique is applied may be implemented as a movable robot, a vehicle, an unmanned aerial vehicle, and the like. The self-driving vehicle 100b may include a self-driving control module for controlling a self-driving function, and the self-driving control module may refer to a software module or a chip where the same is implemented in hardware. The self-driving control module may be included in the self-driving vehicle 100b as a component thereof, but may be connected to the self-driving vehicle 100b by being configured in separate hardware.

The self-driving vehicle 100b may acquire state information of the self-driving vehicle 100b, may detect (recognize) a surrounding environment and an object, may generate map data, may determine a moving path and a driving plan, or may determine an operation, by using the sensor information acquired from various types of sensors. Herein, in order to determine the moving path or driving plan, similarly to the robot 100a, the self-driving vehicle 100b may use sensor information acquired from at least one sensor among a lidar, a radar, and a camera. Particularly, the self-driving vehicle 100b may recognize an environment and an object for an area that is hidden from view or over a particular distance, by receiving sensor information from external devices or by receiving information directly recognized from the external devices.

The self-driving vehicle 100b may perform the above operations by using a learning model configured with at least one artificial neural network. For example, the self-driving vehicle 100b may recognize a surrounding environment and an object by using a learning model, and may determine a driving path by using the recognized surrounding environment information or object information. Herein, the learning model may be for learning directly performed by the self-driving vehicle 100b, or for learning performed by the external device such as the AI server 200, and the like.

Herein, the self-driving vehicle 100b may generate a result by directly using the learning model so as to perform an operation. However, the self-driving vehicle 100b may transmit the sensor information to the external device such as the AI server 200, and the like, and may receive a result generated accordingly so as to perform an operation. The self-driving vehicle 100b may determine a moving path and a driving plan by using at least one among map data, object information detected from the sensor information, and object information acquired from the external device, and may drive according to the determined moving path and the determined driving plan by controlling a driving unit.

Map data may include object identification information on various objects (for example, roads) arranged in a space where the self-driving vehicle 100b drives. For example, the map data may include object identification information on fixed objects such as street lamps, rocks, buildings, and the like, and movable objects such as vehicles, pedestrians, and the like. In addition, the object identification information may include a name, a type, a distance, a position, and the like.

In addition, the self-driving vehicle 100b may perform an operation or drive by controlling the driving unit based on the user's control/interaction. Herein, the self-driving vehicle 100b may acquire intent information on interaction according to a user's motion or speech, and may determine a response based on the acquired intent information so as to perform an operation.

The XR device 100c to which the AI technique is applied may be implemented as a HMD, a HUD provided in a vehicle, a TV, a mobile phone, a smartphone, a PC, a wearable device, a home appliance, a digital signage, a vehicle, a fixed robot or movable robot, and the like. The XR device 100c may analyze 3D point cloud data or image data which is acquired through various sensors or external devices to generate position data and feature data on 3D points, thereby acquiring information on a surrounding space or a real object and outputting an XR object through rendering. For example, the XR device 100c may output an XR object including additional information on the recognized object, by matching the XR object to the recognized object.

The XR device 100c may perform the above operations by using a learning model configured with at least one artificial neural network. For example, the XR device 100c may recognize a real object from 3D point cloud data or image data by using a learning model, and may provide information corresponding to the recognized real object. Herein, the learning model may be for learning directly performed by the XR device 100c, or for learning performed by the external device, such as the AI server 200, and the like.

Herein, the XR device 100c may generate a result by directly using the learning model so as to perform an operation. However, the XR device 100c may transmit the sensor information to the external device such as the AI server 200, and the like, and may receive a result generated accordingly so as to perform an operation.

The robot 100a to which the AI technique and the self-driving technique are applied may be implemented as a guide robot, a transport robot, a cleaning robot, a wearable robot, an entertainment robot, a pet robot, an unmanned aerial vehicle, and the like. The robot 100a to which the AI technique and the self-driving technique are applied may refer to a robot itself having a self-driving function, or the robot 100a interacting with the self-driving vehicle 100b. The robot 100a having the self-driving function may refer to all devices moving by itself according to a given movement path, or determining a movement path by itself without a user control.

The robot 100a having the self-driving function and the self-driving vehicle 100b may use a common sensing method to determine at least one among a moving path and a driving plan. For example, the robot 100a having the self-driving function and the self-driving vehicle 100b may determine at least one among a moving path and a driving plan by using information sensed through a lidar, a radar, or a camera.

The robot 100a interacting with the self-driving vehicle 100b may be present separately from the self-driving vehicle 100b, while the robot 100a may be internally or externally associated with the self-driving function of the self-driving vehicle 100b or may perform an operation associated with a user who boards the self-driving vehicle 100b. Herein, the robot 100a interacting with the self-driving vehicle 100b may acquire sensor information in place of the self-driving vehicle 100b so as to provide the sensor information to the self-driving vehicle 100b, or may acquire sensor information and may generate surrounding environment information or object information so as to provide the information to the self-driving vehicle 100b, and may thus control or assist the self-driving function of the self-driving vehicle 100b.

Alternatively, the robot 100a interacting with the self-driving vehicle 100b may monitor the user who boards the self-driving vehicle 100b or may control functions of the self-driving vehicle 100b through interaction with the user. For example, when it is determined that the driver is drowsy, the robot 100a may activate the self-driving function of the self-driving vehicle 100b or may assist control of the driving unit of the self-driving vehicle 100b. Herein, the functions of the self-driving vehicle 100b which are controlled by the robot 100a may include, in addition to the self-driving function, functions provided from a navigation system or audio system provided in the self-driving vehicle 100b.

Alternatively, the robot 100a interacting with the self-driving vehicle 100b may provide information to the self-driving vehicle 100b or may assist the functions thereof, at the outside of the self-driving vehicle 100b. For example, like a smart traffic light, the robot 100a may provide traffic information including signal information to the self-driving vehicle 100b. Like an automatic electric charger for an electric vehicle, the robot 100a may automatically connect an electric charger to a vehicle inlet by interacting with the self-driving vehicle 100b.

The robot 100a to which the AI technique and the XR technique are applied may be implemented as a guide robot, a transport robot, a cleaning robot, a wearable robot, an entertainment robot, a pet robot, an unmanned aerial vehicle, a drone, and the like. The robot 100a to which the XR technique is applied may refer to a robot that is a target of control/interaction within an XR image. Herein, the robot 100a may be distinguished from the XR device 100c and may be in conjunction with the same.

When the robot 100a that is a target of control/interaction within an XR image acquires sensor information from sensors including a camera, the robot 100a or the XR device 100c generates an XR image based on the sensor information and the XR device 100c outputs the generated XR image. In addition, the robot 100a may operate based on a control signal input through the XR device 100c or of interaction with the user.

For example, the user may identify an XR image corresponding to the viewpoint of the robot 100a that is in conjunction with the external device, such as XR device 100c, and the like, in a remote manner. Through interaction, the user may adjust a self-driving path of the robot 100a, may control an operation or driving thereof, or may identify information on surrounding objects.

The self-driving vehicle 100b to which the AI technique and the XR technique are applied may be implemented as a movable robot, a vehicle, an unmanned aerial vehicle, and the like. The self-driving vehicle 100b to which the XR technique is applied may refer to a self-driving vehicle having a means for providing an XR image, or a self-driving vehicle that is a target of control/interaction within an XR image. Particularly, the self-driving vehicle 100b that is a target of control/interaction within an XR image may be distinguished from the XR device 100c, and may be in conjunction with the same.

The self-driving vehicle 100b having a means for providing an XR image may acquire sensor information from sensors including a camera, and may output an XR image generated on the basis of the acquired sensor information. For example, the self-driving vehicle 100b is provided with an HUD to output an XR image, and may thus provide the passenger with an XR object corresponding to a real object or an object on a screen.

Herein, when the XR object is displayed on the HUD, at least a part of the XR object is displayed to overlap the real object to which the passenger's eyes are directed. On the other hand, when the XR object is displayed on a display provided in the self-driving vehicle 100b, at least a part of the XR object is displayed to overlap an object on the screen. For example, the self-driving vehicle 100b may output XR objects corresponding to objects such as roadways, other vehicles, traffic lights, traffic signs, motorcycles, pedestrians, buildings, and the like.

When the self-driving vehicle 100b that is a target of control/interaction within an XR image acquires sensor information from sensors including a camera, the self-driving vehicle 100b or XR device 100c generates an XR image based on the sensor information and the XR device 100c outputs the generated XR image. In addition, the self-driving vehicle 100b may operate based on a control signal input through the external device such as XR device 100c, and the like, or of interaction with the user.

Hereinafter, various embodiments for a method of controlling the robot 100a, which is an example of the AI apparatus 100 connected to the AI server 200 over the cloud network 10, will be described. However, the following embodiments are not limited to be applicable only to the robot 100a, and may be applied to the other AI apparatuses 100b to 100e within a range in which the technical idea is not changed. For example, the following embodiments may be applied to the self-driving vehicle 100b, the XR device 100c, and the like that are implemented as a movable robot, and the like.

Figure 4:
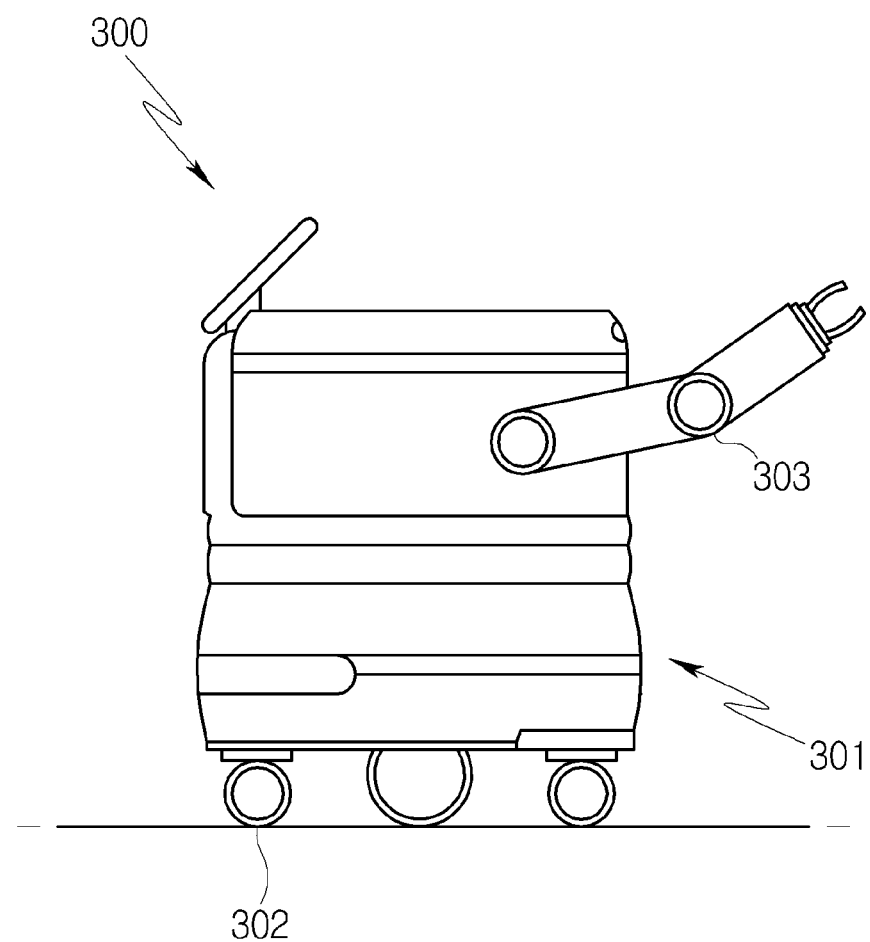
FIG. 4 is a diagram showing a robot according to an embodiment.
Figure 5:
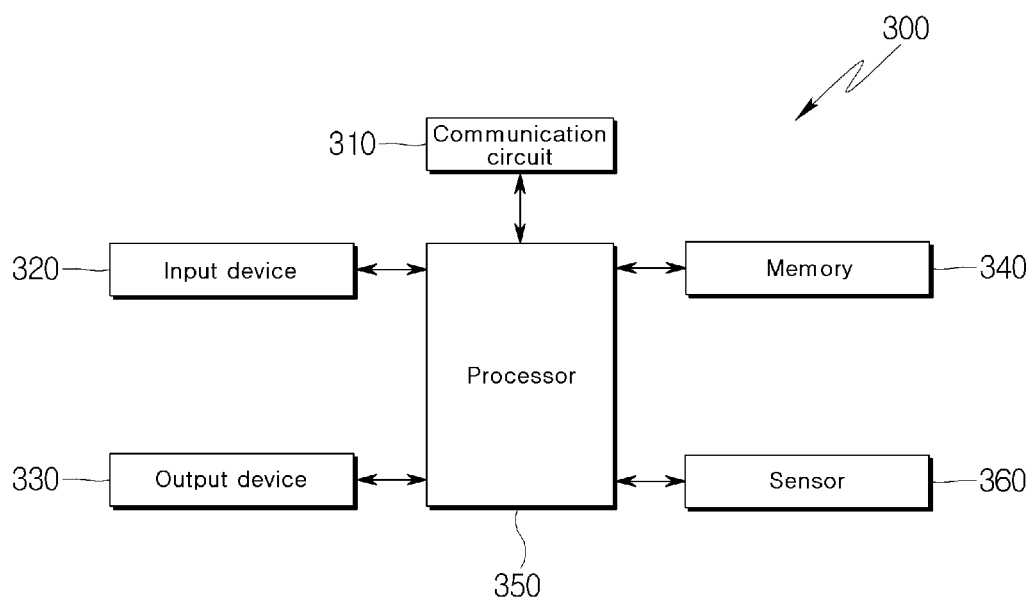
FIG. 5 is a block diagram showing a configuration of a robot according to an embodiment.

FIG. 4 is a diagram showing a robot according to an embodiment. FIG. 5 is a block diagram showing a configuration of a robot according to an embodiment. The robot 300 is the AI apparatus 100 described with reference to FIGS. 1 to 3, and may be, for example, the robot 100a shown in FIG. 3. In describing the embodiment of FIGS. 4 and 5, a duplicate description of the element that is the same or similar to the element shown in FIGS. 1 to 3 will be omitted.

Referring to FIG. 4, the robot 300 may include a robot body 301, a driving wheel 302 coupled to the robot body 301, and at least one joint 303. The robot body 301 forms the appearance of the robot 300. Inside the robot body 301, as elements for driving the robot 300, a communication circuit 310, a memory 340, a processor 350, and the like, which will be described later, may be mounted. In various embodiments, the robot body 301 may be provided with a container capable of loading a package.

The robot 300 may be a moving robot that has the driving wheel 302 and is movable in a self-driving and/or following-driving manner. The driving wheel 302 may be provided with a motor (not shown), or the like. FIG. 4 shows an example in which the robot 300 includes four driving wheels 302, but this embodiment is not limited thereto. That is, the robot 300 may include two or more driving wheels 302. For example, in the case where the robot 300 includes four or more driving wheels 302, the robot 300 may drive with front-wheel drive or rear-wheel drive. In the meantime, FIG. 4 shows an embodiment of the robot 300 driving by using the driving wheels 302, but embodiments are not limited thereto, and the following embodiments may be applied to a robot flying by using a propeller, and the like.

The robot 300 may include the at least one joint 303. FIG. 4 shows the joint 303 provided at a robotic arm as an example, but the joint 303 is not limited to being provided at the robotic arm. The at least one joint 303 may be controlled by a manipulator (not shown) including an actuator and/or a motor.

Referring to FIG. 5, the robot 300 may include the communication circuit 310, an input device 320, an output device 330, the memory 340, the processor 350, and at least one sensor 360. The communication circuit 310 may perform communication between the robot 300 and an external device (for example, the AI server 200 shown in FIG. 2) by using a wired/wireless communication channel. The communication circuit 310 may include, for example, an antenna circuit, a wireless communication circuit, a wired communication circuit, and the like. The communication circuit 310 may convert a signal received from the external device to data that the processor 350 is capable of processing, and may transmit the data to the processor 350.

In various embodiments, the communication circuit 310 may perform communication with a terminal of a manager who wants to send a package and a terminal of a recipient who receives the package. The communication circuit 310 may communicate with the terminal of the manager and the terminal of the recipient through a server (for example, the AI server 200), and the like by using a long-range wireless communication technology (for example, Wi-Fi, LTE, LTE-A, 5G, and the like), or may communicate directly with the terminal of the manager and the terminal of the recipient by using a short-range wireless communication technology (for example, Bluetooth, NFC, and the like).

The input device 320 may receive a command or data for controlling the elements, from outside, for example, the user. The input device 320 may include, for example, a camera, a microphone, a touch panel, button, a switch, a key pad, a jog dial, a jog switch, and the like. In an embodiment, in the case where the robot 300 is implemented with a communication input method that receives a user input only from external devices (for example, a server (for example, the AI server 200), a user terminal, and the like), the input device 320 may be omitted.

The output device 330 may visually, auditorily, and/or tactually output information through a display, a speaker, a haptic actuator, and the like. In an embodiment, the display may be integrated with a touch panel for receiving a user input, so that a touch screen may be configured.

In an embodiment, information to be output from the robot 300 may be transmitted to an external device through the communication circuit 310, and the like. For example, information generated by the robot 300 may be transmitted to a server, a user terminal, and the like through a long-range wireless communication technology (for example, Wi-Fi, LTE, LTE-A, 5G, and the like). The information may be visually, auditorily, and/or tactually output from the server or user terminal. Alternatively, for example, information generated by the robot 300 may be transmitted to an external display device, speaker, and the like through a short-range wireless communication technology (for example, Bluetooth, NFC, and t eh like). The information may be visually and/or auditorily output from the external display device, speaker, and the like. In an embodiment, in the case where the robot 300 is implemented with a communication output method that outputs the generated information only through an external device, the output device 330 may be omitted.

The memory 340 may store various types of data used by at least one element (for example, the processor 350, and the like) of the robot 300. The data may include, for example, software, and input/output data related thereto. The memory 340 may include a volatile memory or a non-volatile memory.

In this embodiment, when the robot 300 communicates with the AI server 200 over the cloud network 10, the memory 340 is implemented using a remote memory location that is allocated through a cloud computing system and is accessible by the robot 300 over the cloud network 10. The remote memory location may be, for example, a region of memory provided in the AI server 200. In this embodiment, the memory 340 including a non-volatile memory may temporarily store a part or all of raw data before being stored in the remote memory location and/or of data to be stored in the remote memory location. When using the remote memory location, resources of the memory 340 provided in the robot 300 are minimized.

The processor 350 may control the above-described elements in order to perform a method of controlling the robot according to the present invention. The processor 350 may control the elements through a remote server (for example, the AI server 200) connected over the cloud network 10.

Specifically, the processor 350 may transmit data collected through the input device 320 and/or a sensor (not shown) (for example, the sensor 140 shown in FIG. 1), to a server. The data transmitted from the processor 350 may be processed by the server. The server may generate a control command according to a result of processing data and may transmit the control command to the robot 300. The processor 350 may control the driving wheels 302 in response to the control command received through the communication circuit 310 and/or may control the at least one joint 303 through the manipulator. Complex operation and processing for data collected by the robot 300 as described above are performed by using the resources of the server. Therefore, the robot 300 collects data from the elements and transmits the data to the server, and requires only the minimal processor resources for controlling the robot 300 based on a control signal received from the server.

In various embodiments, the processor 350 may be configured to further perform operations that may be processed with the minimal resources, in addition to data collection and execution of the control command. For example, the processor 350 may be configured to control the robot 300 by itself when the control command is not received from the server correctly due to deterioration in the communication performance, and the like.

The at least one sensor 360 may collect information on the internal or surrounding environment of the robot 300. The at least one sensor 360 may be configured as one of the following or a combination of several thereof: for example, a proximity sensor, an ambient light sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, a temperature sensor, and the like. In various embodiments, the camera used as the input device 320 may operate as the sensor 360.

Figure 6:
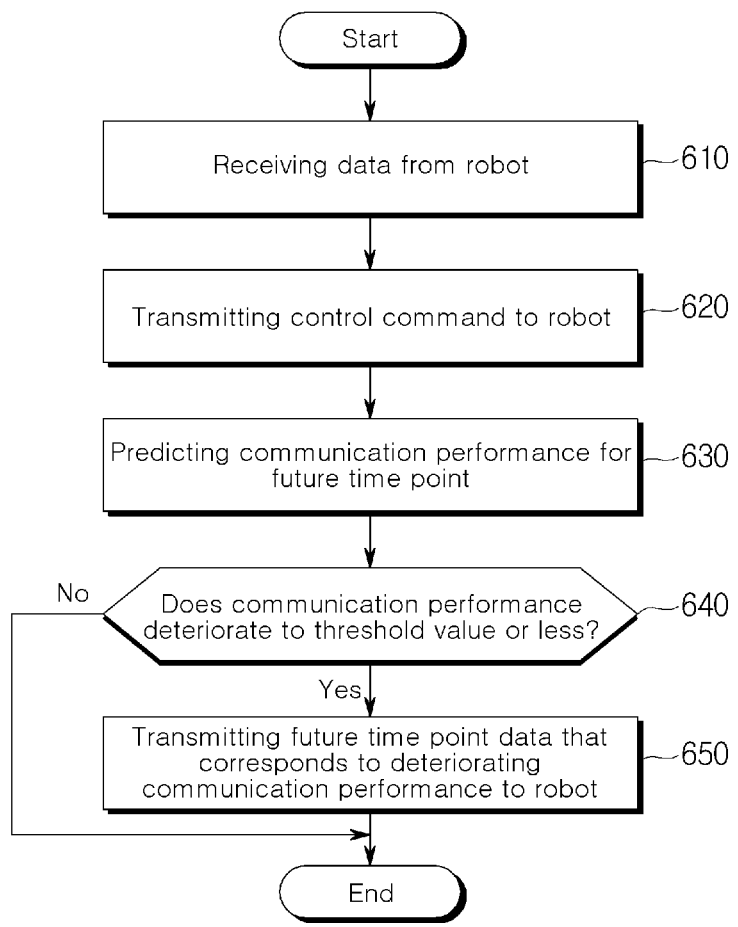
FIG. 6 is a flowchart showing a method of controlling a robot by a server according to an embodiment.

Hereinafter, the method of controlling the robot 300 will be described in detail. FIG. 6 is a flowchart showing a method of controlling a robot by a server according to an embodiment. The server may be, for example, the AI server 200 shown in FIG. 2. Hereinafter, for convenience of description, the AI server 200 will be referred to as the "server". The method of controlling the robot by the server, which is shown in FIG. 6, may be performed after the server and the robot 300 are connected to each other over the cloud network 10.

After being connected to the robot 300 over the cloud network 10, the server may receive data from the robot 300 at step 610, and may transmit a control command for controlling the robot 300 based on the received data, to the robot 300 at step 620. For example, the server may receive data (for example, image data, speech data, user input data, data about a motion state of the driving wheel 302 and joint 303, and the like) collected from the input device 320 and/or the at least one sensor 360 provided in the robot 300. The server may perform necessary operation and processing on the received data, may generate a control command corresponding to a result of processing, and may transmit the control command to the robot 300.

While communicating with the robot 300, the server may predict a communication performance at an arbitrary time point (hereinafter, referred to as future time point) in the future at step 630. The future time point may be a time point after a preset time (for example, a time point after five minutes), but it is not limited thereto. The communication performance may be quantified into an arbitrary value from at least one measurable performance parameter. Examples of the performance parameter used to quantify the communication performance may include, for example, the time required to transmit data from the server to the robot 300 or from the robot 300 to the server, that is, latency. However, the performance parameters are not limited to latency, and may include various factors, such as packet loss, delay jitter, throughput, received signal strength indicator (RSSI), signal-to-noise ratio (SNR), and the like.

Prediction of the communication performance may be performed at preset intervals during communication with the robot 300. For example, while communicating with the robot 300, the server may predict the communication performance after five minutes, every five minutes.

Figure 7:
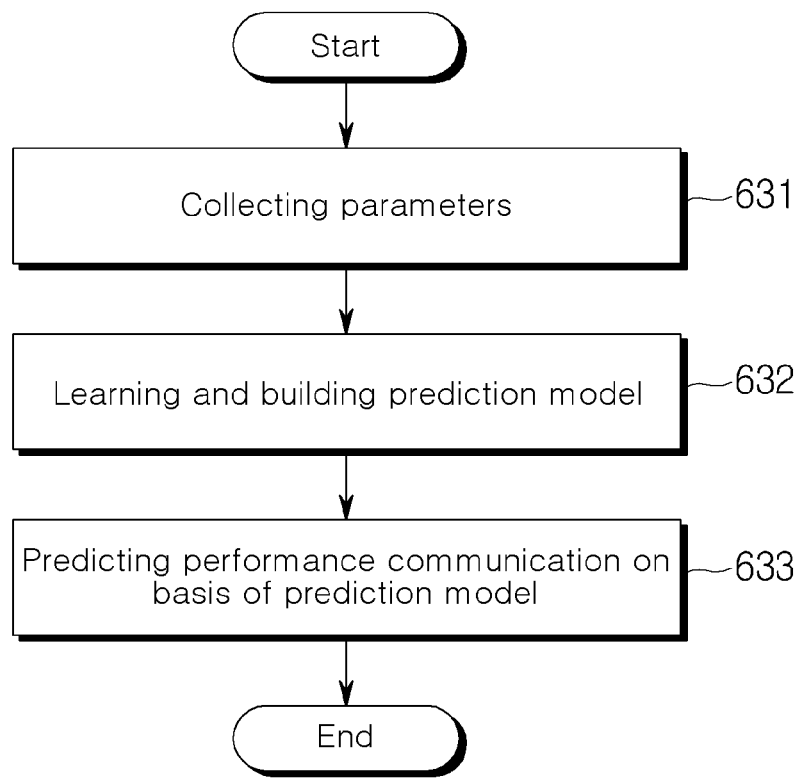
FIG. 7 is a flowchart showing a method of predicting a communication performance according to a first embodiment.

In an embodiment, the robot 300 may predict the communication performance at the future time point through machine learning. FIG. 7 is a flowchart showing a method of predicting communication performance by using machine learning, as a first embodiment.

Referring to FIG. 7, while communicating over the cloud network 10, the server may periodically collect performance parameters for determining the communication performance, at step 631. The performance parameters may include, for example, latency.

The server may learn the performance parameters collected periodically, based on a statistical machine learning algorithm, and may build a prediction model (artificial neural network) of a communication performance over time, at step 632. For example, the server may define an association between time and communication performance (for example, between time and latency) based on statistical values of performance parameters over time.

Afterward, the server may predict the performance communication at the future time point by using the built prediction model, at step 633. The server may predict the communication performance at the future time point based on the association between time defined in the prediction model and communication performance.

FIGS. 6 and 7 shows the case where the server builds the prediction model while communicating with the robot 300, but this embodiment is not limited thereto. That is, in various embodiments, the server may build the prediction model before performing communication with the robot 300. During communication with the robot 300, the server may keep collecting the performance parameters and rebuilding the prediction model.

Figure 8:
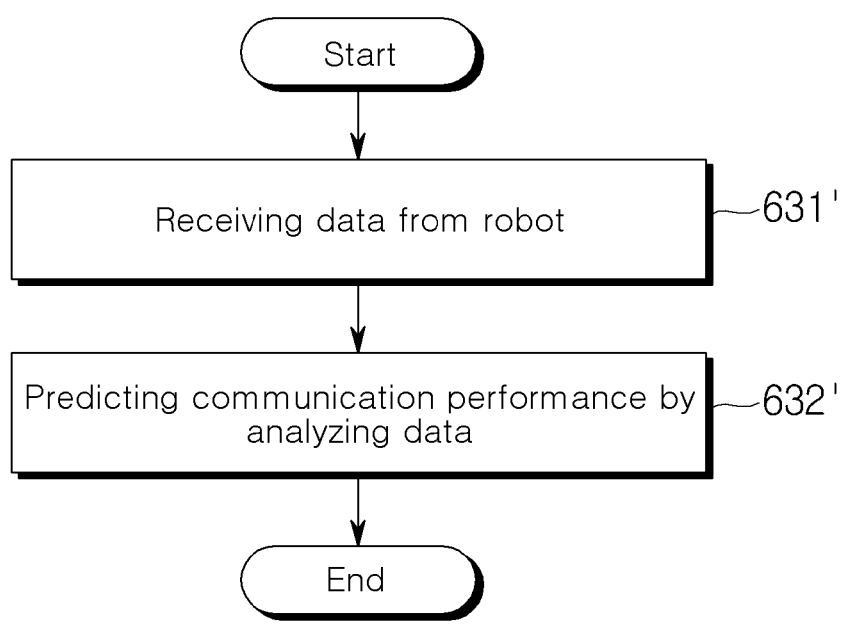
FIG. 8 is a flowchart showing a method of predicting a communication performance according to a second embodiment.

In another embodiment, the server may predict the communication performance at the future time point based on data transmitted from the robot 300. FIG. 8 is a flowchart showing a method of predicting communication performance by using data transmitted from the robot 300, as a second embodiment.

Referring to FIG. 8, the server may receive data from the robot 300 at step 631'. The data received from the robot 300 may be, for example, image data. The server may predict the communication performance based on the received data, at step 632'. For example, the server may extract feature points by analyzing the image data received from the robot, and may identify objects, such as buildings, people, vehicles, and the like, from the extracted feature points. The server may predict the communication performance based on the identified objects. For example, when the number of buildings, people, vehicles, and the like, identified in the image data is equal to or greater than (or greater than) a preset number, the server determines that there is a large amount of communication around the robot 300 or that the noise according to the surrounding environment is high, and thus predicts that accordingly, the communication performance will deteriorate at the future time point.

Afterward, the server may control the robot 300 in response to the predicted communication performance. When the communication performance deteriorates to a preset threshold value or less at the future time point, the control command output from the server does not reach the robot 300 within an appropriate time, and as a result of this, the robot 300 may not be controlled according to the control command correctly. Therefore, before the communication performance deteriorates, the server may control the robot 300 in such a manner as to temporarily slow down (decelerate/delay) or stop the operation of the robot 300. In order to ensure continuity of the operation of the robot 300 in terms of the user, it may be appropriate to decelerate the operation of the robot 300 rather than stop the operation of the robot 300.

In addition, when the communication performance deteriorates to the preset threshold value or less, data transmitted from the robot 300 does not reach the server within an appropriate time, and as a result of this, the server may not generate a control command for the robot 300 in time. Therefore, in response to the deteriorating communication performance, the server may control the robot 300 so that the robot 300 transmits data, such as speech data and/or user input data, which does not require high communication performance rather than data, such as image data, which requires high communication performance, to the server first. In addition, in order to process the reaction of the robot 300, the server may control the robot 300 so that the robot 300 transmits important data (for example, data about the motion state of the driving wheel 302 and joint 303) that the server needs to receive in real time, to the server first.

To this end, when the communication performance deteriorates to the preset threshold value or less at the future time point at step 640, the server transmits future time point data (or future control data) to the robot 300 in response to the deteriorating communication performance, at step 650. The future time point data may include, for example, control information.

The control information may include at least one among a control parameter and an operation program. The control parameter may be quantified information such as an arbitrary numerical value required for the robot 300 to control the driving wheel 302 and/or the joint 303. The operation program may include programming code to define a control scenario of the driving wheel 302 and/or joint 303. The control information may include the future time point at which the robot 300 needs to perform an operation by using the transmitted control information. The future time point may be a time point at which the communication performance is predicted to deteriorate.

As described above, the control information may be composed of the control parameter and the operation program for decelerating the operation of the robot 300. For example, the control information may include deceleration information (deceleration, deceleration time, and the like) for reducing the travel velocity of the robot 300 at the future time point. Alternatively, the control information may include information that enables the joint 303 of the robot 300 to be controlled to move at a reduced velocity and/or angular velocity at the future time point. Alternatively, the control information may include setting-value information of a range of motion of the robot 300 for controlling the range of motion.

Alternatively, the control information may include information on priority of the data that the robot 300 needs to transmit to the server as described above. Herein, the priority may be priority of the data itself, or priority of the sensor 360 that collects the data.

In order to immediately process the reaction of the robot 300, the priority may be set high for the data that the server needs to receive in real time. Such data, as information on the travel of the robot 300 or the movement of the at least one joint 303, may be data about the motion state of the driving wheel 302 and/or joint 303.

The priority may be set high for a small amount of data, such as the user input data, speech data, ultrasonic sensor data, and the like, and the priority may be set low for a large amount of data, such as lidar data. In addition, the priority may be set low for image data, a large amount of data, such as 3D data, and the like. The priority may be set lowest for data (for example, temperature data of a battery, a circuit board, and the like) related to system operation of the robot 300.

The control information transmitted to the robot 300 may be used by the processor 350 so as to control the other elements. For example, the control information may be used to control the driving wheel 302, the manipulator for controlling the joint 303, the communication circuit 310, and/or the at least one sensor 360. Hereinafter, the operation of the robot 300 controlled by using the control information will be described in detail.

Figure 9:
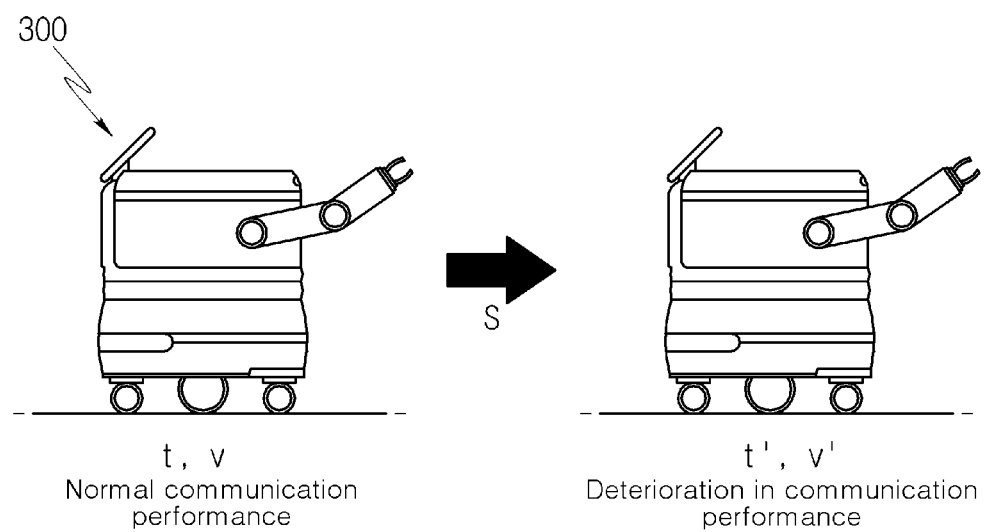
FIG. 9 is a diagram showing an example of controlling a travel velocity of a robot according to a communication performance.

FIG. 9 is a diagram showing an example of controlling a travel velocity of a robot according to a communication performance. In an embodiment, the future time point data transmitted from the server may be used by the robot 300 to control the driving wheel 302 and/or a propeller. When the future time point defined by the future time point data comes, the processor 350 of the robot 300 controls the driving wheel 302 and/or the propeller by using the control information included in the future time point data. At the future time point, the robot 300 autonomously operates on the basis of the control information even though no separate control command is received from the server.

The control information may include at least one among the control parameter and the operation program for reducing the travel velocity of the robot 300 at the future time point. For example, the control information may include a travel velocity, deceleration, deceleration time, and the like at the future time point.

Referring to FIG. 9, at a current time point t, the robot 300 may drive at a first travel velocity v. At a future time point t' at which the communication performance deteriorates, the robot 300 may be controlled to drive at a second travel velocity v' that is lower than the first travel velocity v. In various embodiments, a second travel velocity v' may be variably determined in response to the predicted communication performance. For example, the second travel velocity v' may be determined on the basis of the predicted latency according to Equation 1.

$$v' = (\text{latency}/\text{speed}) * b \qquad \text{[Equation 1]}$$

Herein, the latency is latency at the future time point, the speed is a communication speed at the future time point, and b is an arbitrary adjustment parameter. The adjustment parameter is set in advance by the user, or the like, and may not be applied according to an embodiment.

In order to drive at the second travel velocity v' at the future time point t', the robot 300 may decelerate with the deceleration s that is determined on the basis of the first travel velocity v, which is the current velocity, the difference in time between the future time point t' and the current time point t, and the second travel velocity v', which is the target velocity. When the driving velocity of the robot 300 is reduced, even though the control command is not received from the server correctly due to the deterioration in the communication performance with the server, collision with a surrounding building, a vehicle, a person and/or damage caused by the driving error of the robot 300 is prevented.

Afterward, when the communication performance is improved back, the robot 300 receives the control command from the server correctly. The server may transmit the control command to the robot 300 so that the reduced velocity of the robot 300 returns to the original velocity, that is, the first travel velocity v. The robot 300 may accelerate according to the control command received from the server and may thus drive at the first travel velocity v.

Figure 10:
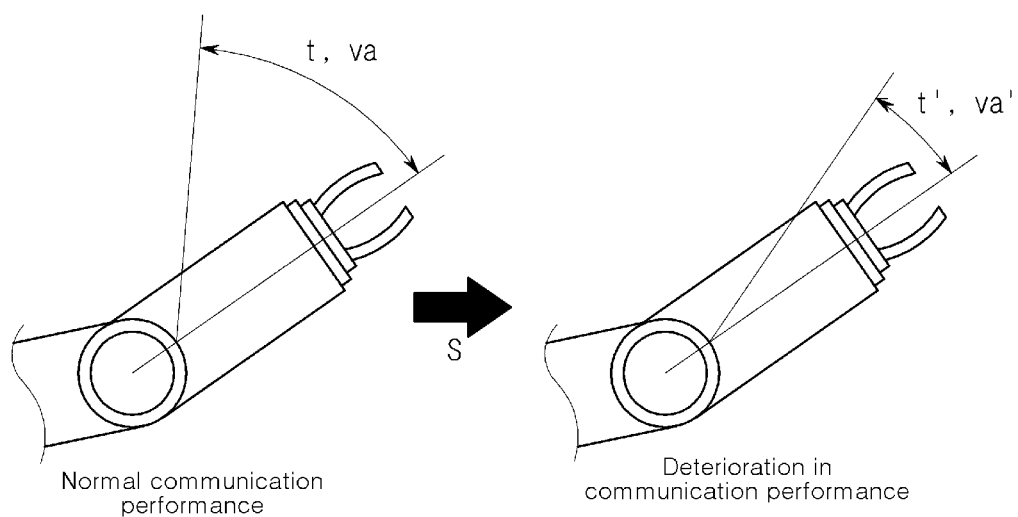
FIG. 10 is a diagram showing an example of controlling a movement velocity of a joint of a robot according to a communication performance.

FIG. 10 is a diagram showing an example of controlling the movement velocity of the joint of the robot according to the communication performance. In an embodiment, the future time point data transmitted from the server may be used by the robot 300 to control the at least one joint 303. When the future time point defined by the future time point data comes, the processor 350 of the robot 300 controls the manipulator by using the control information included in the future time point data. The at least one joint 303 provided at the robot 300 may be controlled by the manipulator to move at a target movement velocity.

The control information may include at least one among the control parameter and the operation program for reducing the movement velocity of the at least one joint 303 at the future time point. For example, the control information may include velocity, angular velocity, deceleration, deceleration time, and the like for the at least one joint 303 at the future time point.

Referring to FIG. 10, at a current time point t, the joint 303 of the robot 300 may rotate at a first angular velocity va. At a future time point t' at which the communication performance deteriorates, the joint 303 of the robot 300 may be controlled to move at a second angular velocity va' that is lower than the first angular velocity va.

In order to rotate the joint 303 at the second angular velocity va' at the future time point t', the robot 300 may decelerate the joint 303 with the deceleration s that is determined on the basis of the first angular velocity va, which is the current angular velocity, the difference in time between the future time point t' and the current time point t, and the second angular velocity va', which is the target velocity. When the rotational velocity of the joint 303 is reduced, even though the control command is not received from the server correctly due to the deterioration in the communication performance with the server, collision with a nearby person is prevented, or at least, injury to the person damage to the robot is minimized in the case of collision.

Figure 11:
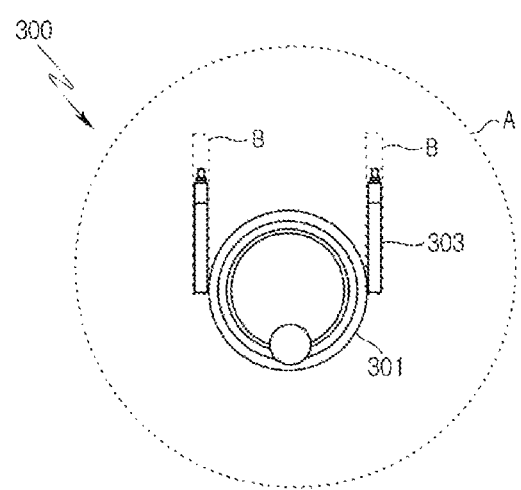
FIG. 11 is a diagram showing an example of controlling a range of motion of a robot according to a communication performance.

FIG. 11 is a diagram showing an example of controlling a range of motion of a robot according to a communication performance. Particularly, FIG. 11 is a plan view as viewed from above the robot 300, and shows an outer boundary A around the robot 300 and an inner boundary B.

In an embodiment, the future time point data transmitted from the server may be used by the robot 300 to control the at least one joint 303. Specifically, the future time point data may be used to control the range of motion of the at least one joint 303 so that the range of motion is within a preset range.

When the future time point defined by the future time point data comes, the processor 350 of the robot 300 controls the manipulator by using the control information included in the future time point data. The at least one joint 303 provided at the robot 300 may be moved within the preset range by the manipulator.

Referring to FIG. 11, the outer boundary A limits the travel range of the robot 300. The outer boundary A may be defined as a circle, but is not necessarily limited thereto. The inner boundary B limits a range of reach of the robotic arm as the joint 303 is controlled. The shape of the inner boundary B may be determined depending on the form, structure, and the like of the robotic arm.

The outer boundary A is a range larger than the inner boundary B that the robotic arm reaches, and may be, for example, a single closed boundary for preventing the body 301 or driving wheel 302 of the robot 300 from colliding with an external element. However, this embodiment is not necessarily limited thereto, and the travel range of the robot 300 may be limited to be smaller than the range of reach of the robotic arm.

The control information may include information for defining the outer boundary A and the inner boundary B at the future time point when the communication performance deteriorates. The range of motion of the robot 300 may be defined by the outer boundary A and the inner boundary B. At least one among the outer boundary A and the inner boundary B may be defined as having a smaller range and as being limited to be closer to the body 301 of the robot 300 when the communication performance deteriorates. Accordingly, the range of motion of the robot 300 may be reduced. When the range of motion of the robot 300 is reduced, even though the control command is not received from the server correctly due to the deterioration in the communication performance with the server, collision with a nearby person is prevented, or at least, injury to the person and damage to the robot is minimized in the case of collision.

Figure 12:
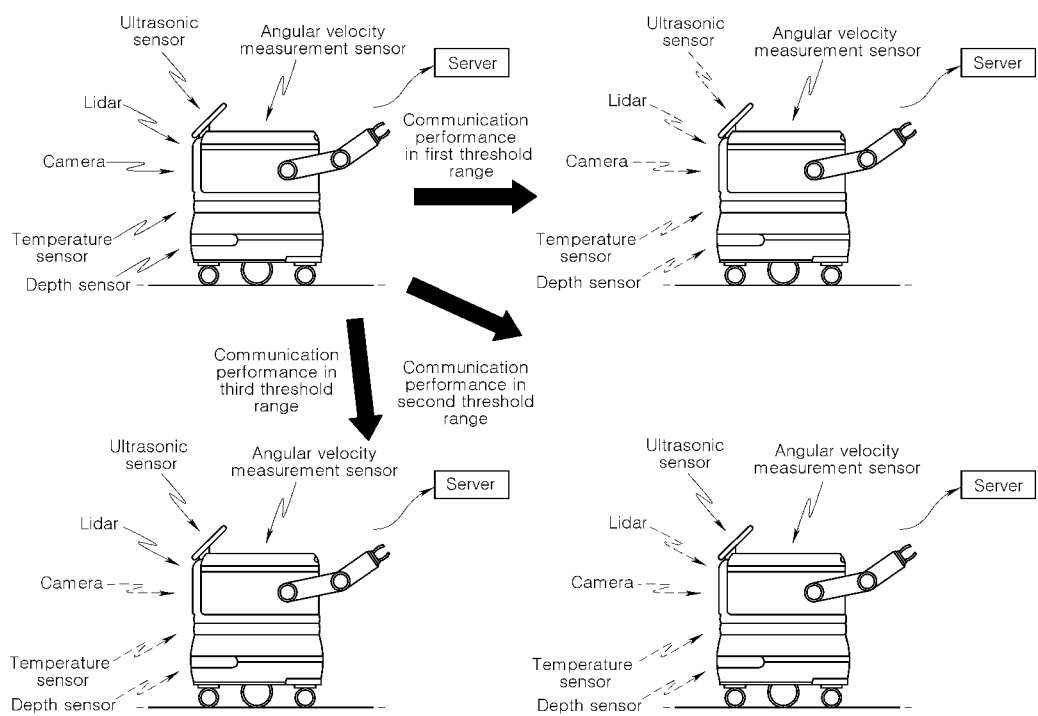
FIG. 12 is a diagram showing an example of controlling transmission of data of a robot according to a communication performance.

FIG. 12 is a diagram showing an example of controlling transmission of data of a robot according to a communication performance. In an embodiment, the future time point data transmitted from the server may be used to control collecting data by the robot 300 and transmitting the data to the server. When the future time point defined by the future time point data comes, the processor 350 of the robot 300 collects data according to the priority included in the future time point data and transmits the collected data to the server. That is, the robot 300 may control an on/off operation of the sensor 360 in order to collect data for which the priority is set high, and may transmit the collected data to the server.

For example, before the communication performance deteriorates, the robot 300 may collect data through an angular velocity measurement sensor of the motor controlling the driving wheel 302 and/or the joint 303, an ultrasonic sensor, a lidar, a camera, a temperature sensor, a depth sensor, and the like, and may transmit the collected data to the server 200.

When the future time point data is received from the server in response to the deterioration in the communication performance, as the future time point comes, the robot 300 collects data from an element for which the priority is set high, and transmits the collected data to the server 200. In this embodiment, the robot 300 keeps the element turned off that does not collect data, thereby reducing power consumption. The priority may be determined on the basis of, for example, importance of data and/or an amount of data.

When the communication performance is in a first threshold range, the robot 300 collects data from an angular velocity measurement sensor for which the priority is set high. When the communication performance is in a second threshold range higher than the first threshold range, the robot 300 collects data from the angular velocity measurement sensor and the ultrasonic sensor. When the communication performance is in a third threshold range higher than the second threshold range, the robot 300 collects data from the angular velocity measurement sensor, the ultrasonic sensor, and the lidar sensor.

As described above, when the communication performance deteriorates, the robot 300 does not collect data from a camera, a temperature sensor, and a depth sensor that have a large amount of data and/or have low importance, or the robot 300 does not transmit the data to the server 200 even though the data is collected.

Figure 13:
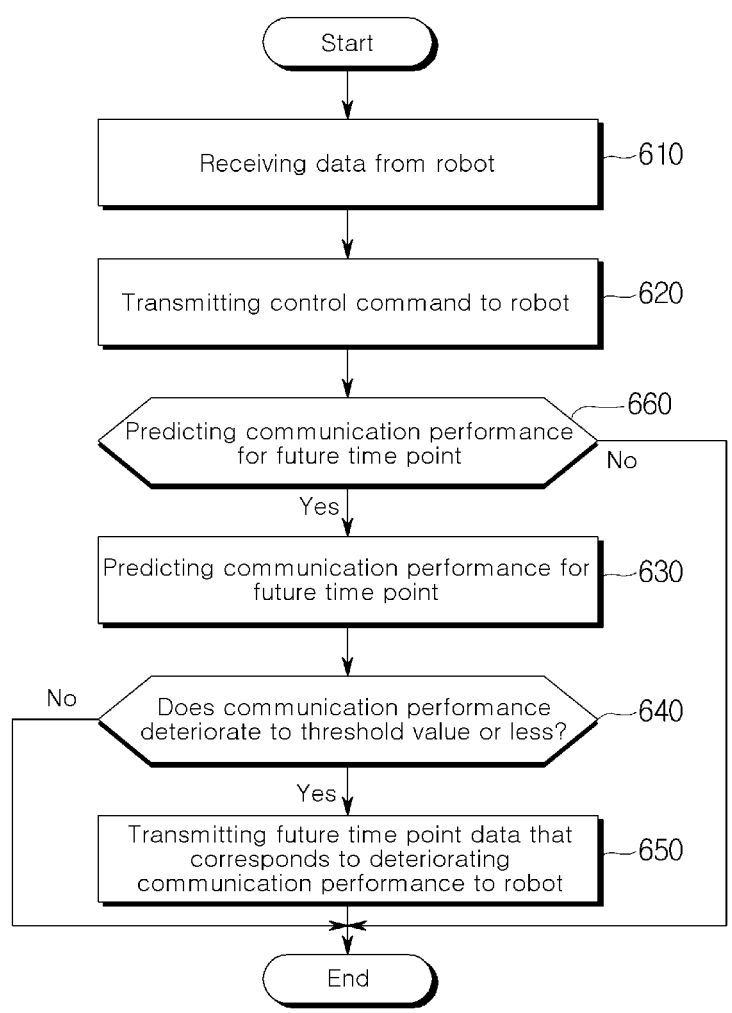
FIG. 13 is a flowchart showing a method of controlling a robot by a server according to another embodiment.

FIG. 13 is a flowchart showing a method of controlling a robot by a server according to another embodiment. The embodiment shown in FIG. 13 is substantially the same as the embodiment shown in FIG. 6 except that when the server determines that the communication performance needs to be measured, the server measures the communication performance and performs control of the robot 300 accordingly. Therefore, in describing the embodiment of FIG. 13, the same step as that of FIG. 6 is denoted by the same reference numeral, and a detailed description thereof will be omitted.

After being connected to the robot 300 over the cloud network 10, the server may receive data from the robot 300 at step 610, and may transmit a control command for controlling the robot 300 based on the received data, to the robot 300 at step 620. For example, the server may receive data (for example, image data, speech data, user input data, data about a motion state of the driving wheel 302, propeller, and joint 303, and the like) collected from the input device 320 and/or the sensor 360 provided in the robot 300. The server may perform necessary operation and processing on the received data, may generate a control command corresponding to a result of processing, and may transmit the control command to the robot 300.

While communicating with the robot 300, the server may determine whether the communication performance needs to be predicted, at step 660. For example, when the server determined that ensuring the communication performance with the robot 300 is important, the server determines that the communication performance needs to be predicted. In other words, prediction of the communication performance may be performed when it is determined that real-time reception of data about the robot 300 and generation/transmission of the control command according thereto are important. For example, prediction of the communication performance is performed when the robot 300 is driving on a complex road, when the robot 300 is driving on a road that requires precise control, such as an unpaved road, when the robot 300 is driving at a high velocity, when multiple buildings or people that may collide with the robot 300 are present around the robot, and so on.

In this embodiment, the server may extract feature points by analyzing the image data received from the robot 300, and may identify objects, such as buildings, people, road conditions, traffic signs, vehicles, bridges, intersections, and the like, from the extracted feature points. When the identified objects satisfy a preset condition, the server predicts the communication performance. Herein, examples of the preset condition may include, for example, a condition in which the number of buildings, people, and vehicles is greater than a preset number, a condition in which traffic signs, bridges, and intersections are identified from an image, a condition in which the number of irregular features on the road is greater than a preset number, and so on.

Alternatively, the server may determine the current travel velocity of the robot 300 based on data about a motion state of the driving wheel 302, propeller, joint 303, and the like, which is received from the robot 300. When the current travel velocity of the robot 300 is higher than a preset velocity, the server predicts the communication performance.

When it is determined that the communication performance needs to be predicted, the server predicts the communication performance for the future time point based on machine learning or analysis of data (for example, image data) received from the robot 300, at step 630. When the predicted communication performance deteriorates to a preset threshold value or less at step 640, the server transmits the future time point data to the robot 300 in response to the deteriorating communication performance, at step 650. The future time point data may include control information for controlling the operation of the robot 300.

The control information may be composed of, for example, a control parameter and an operation program for decelerating the operation of the robot 300. Alternatively, the control information may include information on priority of data that the robot 300 needs to transmit to the server. While communicating with the robot 300, the server repeatedly predicts the communication performance. When the communication performance is greater than or equal to the preset threshold value, the server generates a control command and transmits the control command to the robot 300 normally.

Figure 14:
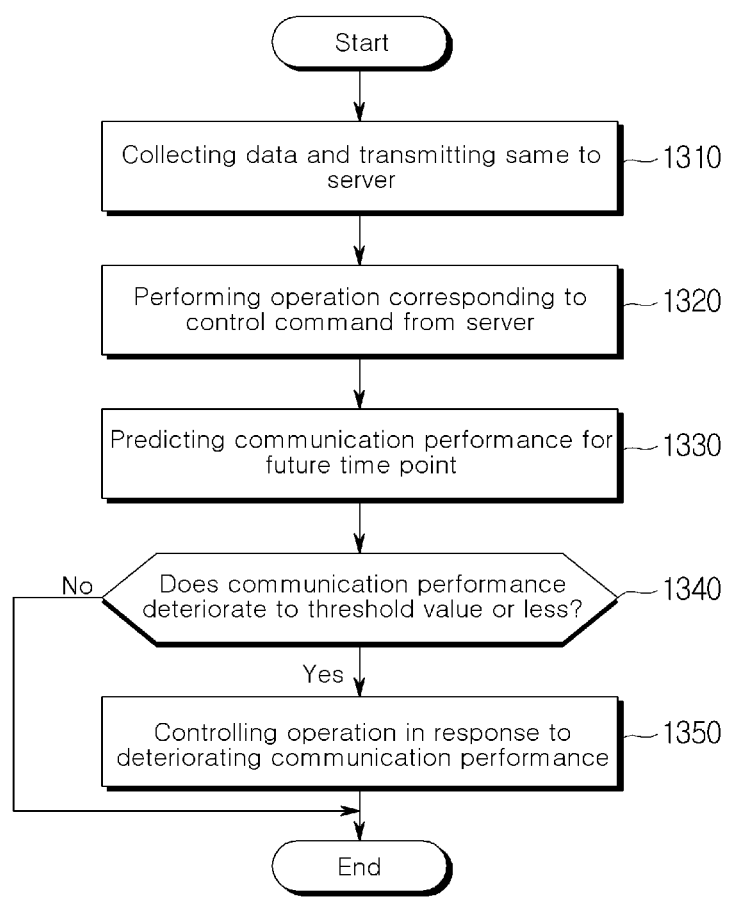
FIG. 14 is a flowchart showing a method of controlling a robot according to an embodiment.

FIG. 14 is a flowchart showing a method of controlling a robot according to an embodiment. In various embodiments the robot 300 may predict the communication performance by itself and may perform control accordingly. The following steps may be performed by the processor 350 provided in the robot 300, but are not limited thereto. In various embodiments, at least a part of the following steps may be performed by other elements provided in the robot 300.

The method of controlling the robot which is shown in FIG. 14 may be performed after the robot 300 and the server are connected to each other over the cloud network 10. The robot 300 may transmit data collected within the robot 300 to the server at step 1310, and may perform an operation corresponding to a control command received from the server at step 1320.

While communicating with the server, the robot 300 may predict the communication performance for the future time point at step 1330. In various embodiments, as described above with reference to FIG. 7, the robot 300 may predict the communication performance for the future time point through machine learning, or may predict the communication performance for the future time point through analysis of data (for example, image data) collected from the robot 300. A method of predicting the communication performance by the robot 300 is similar to the method of predicting the communication performance by the server, which is described with reference to FIGS. 7 and 8, and thus a detailed description thereof will be omitted.

In this embodiment, the robot 300 may be provided with resources of the memory 340 and the processor 350 for processing machine learning or image data. For example, the robot 300 may include the learning processor 240 shown as being included in the AI server 200 in FIG. 2. The memory 340 of the robot 300 may store a prediction model of communication performance over time during machine learning.

As a result of predicting the communication performance, when the communication performance deteriorates to a preset threshold value or less at the future time point at step 1340, the robot 300 controls an operation in response to the deteriorating communication performance at step 1350. For example, as described above with reference to FIGS. 9 and 10, the robot 300 may control the driving wheel 302 and/or the manipulator so as to reduce the travel velocity or reduce the movement velocity of the joint 303. Alternatively, the robot 300 may control the communication circuit 310 so as to transmit data collected through an element for which the priority is set high, to the server. The control of the robot 300 may be performed by using the control information (see FIG. 6) that is transmitted in advance from the server to be used when the communication performance deteriorates.

In such an embodiment, the robot 300 may predict the communication performance by itself and may perform control accordingly. Consequently, the robot 300 may immediately respond to the change in communication performance, so that rapid response to the deterioration in the communication performance is possible.

Figure 15:
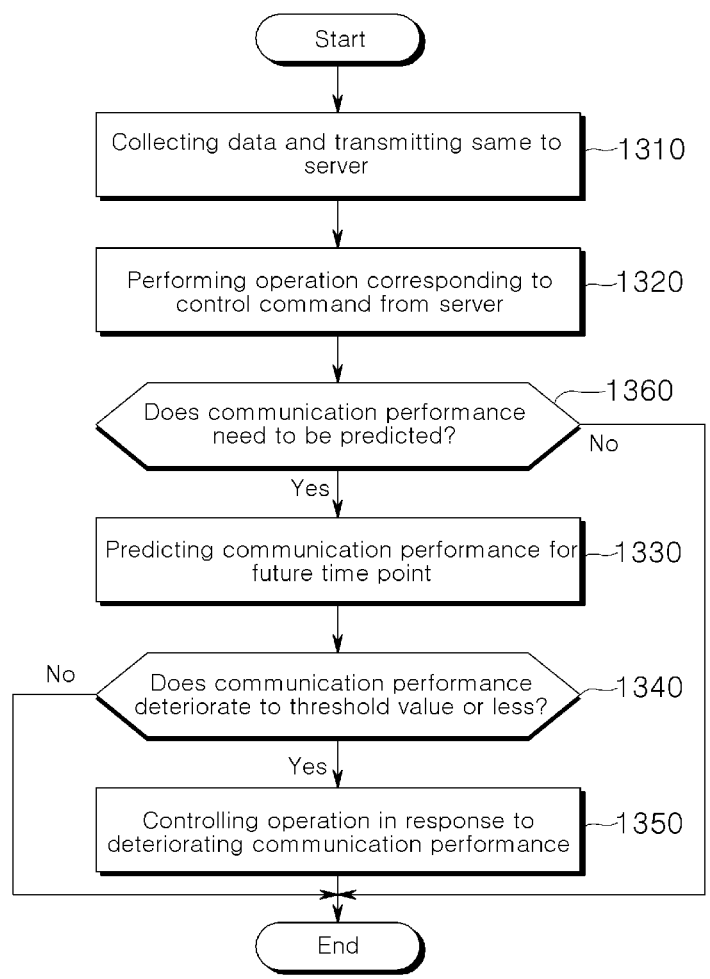
FIG. 15 is a flowchart showing a method of controlling a robot according to another embodiment.

FIG. 15 is a flowchart showing a method of controlling a robot according to another embodiment. The embodiment shown in FIG. 15 is substantially the same as the embodiment shown in FIG. 14 except that when the robot 300 determines that the communication performance needs to be measured, the robot measures the communication performance and performs an operation accordingly. Therefore, in describing the embodiment of FIG. 15, the same step as that of FIG. 14 is denoted by the same reference numeral, and a detailed description thereof will be omitted. After being connected to the server over the cloud network 10, the robot 300 may transmit data collected within the robot 300 to the server at step 1310, and may perform an operation corresponding to a control command received from the server at step 1320.

While communicating with the server, the robot 300 may determine whether the communication performance needs to be predicted, at step 1360. For example, the robot 300 may extract feature points by analyzing the image data collected from the robot 300, and may identify objects, such as buildings, people, road conditions, traffic signs, vehicles, bridges, intersections, and the like, from the extracted feature points. When the identified objects satisfy a preset condition, the robot 300 predicts the communication performance. Herein, examples of the preset condition may include, for example, a condition in which the number of buildings, people, and vehicles is greater than a preset number, a condition in which traffic signs, bridges, and intersections are identified from an image, a condition in which the number of irregular features on the road is greater than a preset number, and so on.

Alternatively, the robot 300 may determine the current travel velocity of the robot 300 based on data about a motion state of the driving wheel 302 and the joint 303. When the current travel velocity is higher than a preset velocity, the robot 300 predicts the communication performance.

When it is determined that the communication performance needs to be predicted, the robot 300 predicts the communication performance for the future time point based on machine learning or analysis of image data, and the like, at step 1330. When the predicted communication performance deteriorates to a preset threshold value or less at step 1340, the robot 300 controls an operation in response to the deteriorating communication performance at step 1350. For example, as described above with reference to FIGS. 9 and 10, the robot 300 may control the driving wheel 302 and/or the manipulator so as to reduce the travel velocity or reduce the movement velocity of the joint 303. Alternatively, the robot 300 may control the communication circuit 310 so as to transmit data collected through an element for which the priority is set high, to the server.

Various embodiments provide a robot that is controlled through a server based on the cloud, a method of controlling the robot, and the server for controlling the robot. Various embodiments provide a robot, a method of controlling the robot, and a server for controlling the robot, in which latency is predicted on the basis of machine learning, and movement and/or manipulation at a time when latency in communication between the server and the robot is expected to increase is controlled.

According to an embodiment, there is provided a server communicating with a robot that is driven by using at least one among a driving wheel, a propeller, and a manipulator moving at least one joint. The server includes: a communication circuit receiving data collected from the robot; and a processor transmitting, to the robot, a control command for controlling the robot in response to a result of analyzing the data, wherein when a communication performance with the robot is predicted to deteriorate at a first future time point, the processor may transmit future time point data corresponding to a result of prediction to the robot, and the robot may decelerate an operation of the robot or may reduce an operation range of the robot based on the future time point data.

The processor may learn a performance parameter collected during communication with the robot, may build a prediction model defining the communication performance over time, and may predict the communication performance for the future time point based on the prediction model. The processor may receive image data from the robot, and when the number of one or more objects identified within the image data is greater than a preset number, the processor may predict that the communication performance for the future time point will deteriorate.

The future time point data may include deceleration information for causing a travel velocity of the robot to reach a target velocity by controlling at least one among the driving wheel and the propeller, when the first future time point comes. The target velocity may be variably determined on the basis of at least one among latency and a communication speed that are predicted for the first future time point.

The future time point data may include deceleration information for controlling a movement velocity of the at least one joint provided at the robot so that the movement velocity reaches a target velocity or for controlling an operation range of the at least one joint so that the operation range becomes a preset range, when the first future time point comes.

The future time point data may include information on priority of data to be collected by the robot and transmitted to the server when the first future time point comes. The priority may be set relatively high for data about travel of the robot and movement of the at least one joint or for a small amount of data, and may be set relatively low for a large amount of data.

The processor may receive image data from the robot, and when one or more objects identified within the image data satisfy a preset condition, the processor may predict the communication performance, and the preset condition may include at least one among a condition in which the number of the one or more objects is greater than a preset number, a condition in which at least one among a traffic sign, a bridge, and an intersection is identified as the one or more objects, and a condition in which the number of irregular features identified as the one or more objects is greater than a preset number.

When the communication performance is predicted to be improved at a second future time point after the first future time point, the processor may transmit future time point data corresponding to a result of prediction to the robot, and the robot may accelerate the operation of the robot or may increase the operation range of the robot based on the future time point data.

According to an embodiment, there is provided a robot including: a driving unit for driving the robot and including at least one among a driving wheel, a propeller, and a manipulator moving a joint provided at the robot unit; multiple sensors collecting data about the robot; a communication circuit transmitting the data collected from the multiple sensor, to a server; and a processor controlling the driving unit so that an operation of the robot is decelerated or an operation range of the robot is reduced, when future time point data is received from the server in response to deterioration in a communication performance for a first future time point.

The future time point data may include deceleration information for at least one among the driving wheel, the propeller, and the manipulator. The future time point data may include priority of the multiple sensors, and the processor may collect the data from at least one or several of the multiple sensors for which the priority is set high, and may transmit the collected data to the server. The processor may control the remaining one or several sensors for which the priority is set low so that the remaining one or several sensors are turned off.

The processor may predict the communication performance for the first future time point, and when the communication performance is predicted to deteriorate, the processor may perform control so that the operation of the robot is decelerated or the operation range is reduced.

The processor may learn a performance parameter collected during communication with the server, may build a prediction model defining the communication performance over time, and may predict the communication performance for the first future time point based on the prediction model. The processor may identify one or more objects from image data collected from the sensors, and when the number of the one or more objects is greater than a preset number, the processor may predict that the communication performance for the first future time point will deteriorate.

The processor may identify one or more objects from image data collected from the sensors, and when the one or more objects satisfy a preset condition, the processor may predict the communication performance, and the preset condition may include at least one among a condition in which the number of the one or more objects is greater than a preset number, a condition in which at least one among a traffic sign, a bridge, and an intersection is identified as the one or more objects, and a condition in which the number of irregular features identified as the one or more objects is greater than a preset number. The processor may predict the communication performance for a second future time point after the first future time point, and when the communication performance is predicted to be improved, the processor may perform control so that the operation of the robot is accelerated or the operation range is increased.

According to an embodiment, there is provided a method of controlling a robot, the method including: transmitting data collected from multiple sensors, to a server; controlling an operation of the robot based on a control command received from the server; receiving future time point data for an arbitrary future time point from the server; and decelerating the operation of the robot in response to the future time point data, wherein the future time point data is received from the server when a communication performance between the server and the robot is predicted to deteriorate at the future time point.

The decelerating of the operation of the robot may include: decelerating a travel velocity of the robot or a movement velocity of a joint so that the travel velocity of the robot or the movement velocity of the joint reaches a target velocity when the future time point comes.

In the robot, the method of controlling the robot, and the server for controlling the robot according to various embodiments, malfunction of the robot and the resulting accident can be prevented when the control command is not transmitted to the robot correctly due to deterioration in the communication performance. In the robot, the method of controlling the robot, and the server for controlling the robot according to various embodiments, the robot is controlled through the cloud server, so that the size of the processor provided in the robot can be reduced and the manufacturing costs of the robot can be reduced.

In certain implementations, a server communicating with a robot may comprise: a communication circuit to: receive data from the robot, and transmit, to the robot, a control command for controlling the robot in response to the data; and a processor to manage the communication circuit, wherein when communication performance with the robot is predicted to deteriorate at a prescribed time point, the processor manages the communication circuit to transmit future control data to the robot, and the future control data causes the robot to at least one of decelerate an operation of the robot or reduce an operation range of the robot at the prescribed time point.

In the server, the processor may learn a performance parameter collected during communication with the robot, build a prediction model defining the communication performance over time, and predict the communication performance for the prescribed time point based on the prediction model. In the server, the processor may receive image data from the robot, and the processor predicts that the communication performance will deteriorate at the prescribed time point when the number of objects identified within the image data is greater than a preset number.

In the server, the future control data may include deceleration information for causing a travel velocity of the robot to be reduced to a target velocity at the prescribed time point. The target velocity may be determined based on at least one of a latency or a communication speed that are predicted for the prescribed time point.

The future control data may include information identifying at least one of a movement velocity of at least one joint provided at the robot or an operation range of the at least one joint at the prescribed time point. The future control data may include information on a priority of data to be collected by the robot and transmitted to the server at the prescribed time point. The future control data may prioritize collection and transmission, by the robot, of data about travel of the robot, data about movement of at least one joint included in the robot, and first sensor data that is smaller than a particular size over second sensor data that is larger than the particular size.

The server may receive image data from the robot, and when one or more objects identified within the image data satisfy a preset condition, the processor predicts that the communication performance will deteriorate at the prescribed time point, and the preset condition may include at least one of: a quantity of the one or more objects identified within the image data being greater than a first preset number, the one or more objects identified within the image data including at least one of a traffic sign, a bridge, or an intersection, or a quantity of irregular features identified as the one or more objects being greater than a second preset number.

When the communication performance is predicted to be improved after the prescribed time point, the future control data may further cause the robot to at least one of accelerate the operation of the robot or increase the operation range of the robot after the prescribed time point.

In certain examples, a robot may comprise: a driving wheel; a joint; sensors collecting data; a communication circuit transmitting data collected by one or more of the sensors to a server; and a processor controlling at least one of the driving wheel or the joint so that at least one of an operation of the robot is decelerated or an operation range of the robot is reduced in response to a deterioration predicted in communication performance between the robot and the server at a prescribed time point.

In the robot, the processor may manage the at least one of the driving wheel or the joint to decelerate at the prescribed time point. In the robot, respective priorities may be determined for the sensors, and at the prescribed time point, the processor collects the data from a first subset of the sensors and not from a second subset of the sensors based on the respective priorities and transmits the collected data from the first subset of the sensors to the server. The processor may turn off the second subset of the sensors at the prescribed time point.

In the robot, the processor may predict that the communication performance between the robot and the server will deteriorate at the prescribed time point, and generates control data so that the at least one of the operation of the robot is decelerated or the operation range is reduced at the prescribed time point. For example, the processor may learn a performance parameter collected during communication with the server, build a prediction model defining the communication performance over time, and predict the communication performance for the prescribed time point based on the prediction model.

When more than a threshold quantity of objects is identified from image data collected from the sensors, the processor may predict that the communication performance will deteriorate at the prescribed time point. The processor may identify one or more objects from image data collected from the sensors, and when the one or more objects satisfy a preset condition, the processor may predict the deterioration of the communication performance, and the preset condition may include at least one of: a quantity of the one or more objects identified in the image data being greater than a first preset number, the one or more objects identified in the image data including at least one of a traffic sign, a bridge, or an intersection, or a number of irregular features identified as the one or more objects being greater than a second preset number.

The processor may perform control so that the at least one of the operation of the robot is accelerated or the operation range is increased after the prescribed time point when the communication performance is predicted to be improved. The processor may cause the at least one of the operation of the robot to be decelerated or the operation range of the robot to be reduced at the prescribed time point based on control data received from the server.

In certain implementations, a method of controlling a robot may comprise: transmitting, to a server, data collected from one or more sensors of the robot; receiving, from the server, a control command regarding an operation of the robot based on the data; receiving, from the server, future control data for a future time; and decelerating an operation of the robot at the future time in response to the future control data, wherein the future control data is received from the server when a communication performance between the server and the robot is predicted to deteriorate at the future time. For example, the decelerating of the operation of the robot may include at least one of reducing a travel velocity of the robot or a movement velocity of a joint of the robot at the future time.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A server communicating with a robot, the server comprising:
   a communication circuit configured to:
      receive data from the robot, and
      transmit, to the robot, future control data for controlling the robot in response to the data; and
   a processor configured to manage the communication circuit,
   wherein the processor is further configured to:
      receive image data from the robot,
      identify objects in the image data,
      predict, based on a number of identified objects, whether communication performance with the robot will deteriorate at a prescribed time point, and
      when the communication performance with the robot is predicted to deteriorate at the prescribed time point, manage the communication circuit to transmit, to the robot, the future control data causing the robot to at least one of decelerate an operation of the robot or reduce an operation range of the robot at the prescribed time point, and
   wherein the processor is further configured to predict that the communication performance deterioration will occur at the prescribed time point when the number of identified objects is greater than a preset number.

2. The server of claim 1, wherein the processor learns a performance parameter collected during communication with the robot, builds a prediction model defining the communication performance over time, and predicts the communication performance for the prescribed time point based on the prediction model.

3. The server of claim 1, wherein the future control data includes deceleration information for causing a travel velocity of the robot to be reduced to a target velocity at the prescribed time point.

4. The server of claim 3, wherein the target velocity is determined based on at least one of a latency or a communication speed that are predicted for the prescribed time point.

5. The server of claim 1, wherein the future control data includes information identifying at least one of a movement velocity of at least one joint provided at the robot or an operation range of the at least one joint at the prescribed time point.

6. The server of claim 1, wherein the future control data includes information on a priority of data to be collected by the robot and transmitted to the server at the prescribed time point.

7. The server of claim 6, wherein the future control data prioritizes collection and transmission, by the robot, of data about travel of the robot, data about movement of at least one joint included in the robot, and first sensor data that is smaller than a particular size over second sensor data that is larger than the particular size.

8. The server of claim 1, wherein the processor is further configured to predict that the communication performance will deteriorate at the prescribed time point when the identified objects satisfy a preset condition, and
   the preset condition includes that:
      the identified objects include at least one of a traffic sign, a bridge, or an intersection, or
      a number of the identified objects with irregular features is greater than a second preset number.

9. The server of claim 1, wherein when the communication performance is predicted to be improved at after the prescribed time point, the future control data further causes the robot to at least one of accelerate the operation of the robot or increase the operation range of the robot after the prescribed time point.

10. A robot comprising:
    a driving wheel;
    a joint;
    sensors collecting data;
    a communication circuit configured to transmit data collected by one or more of the sensors to a server; and
    a processor configured to control at least one of the driving wheel or the joint,
    wherein the processor is further configured to:
       obtain image data by using at least one of the sensors,
       control the communication circuit to transmit the image data to the server to predict deterioration of communication performance between the server and the robot,
       receive future control data through the communication circuit, and
       decelerate an operation of the robot or reduce an operation range of the robot in response to receiving the future control data, which is transmitted by the server when the server predicts deterioration of communication performance between the server and the robot at a prescribed time point based on a number of identified objects in the image data,
    wherein the processor is further configured to:
       predict, based on the number of identified objects in the image data, that the communication performance between the robot and the server will deteriorate at the prescribed time point, and generate control data so that the at least one of the operation of the robot is decelerated or the operation reduced at the prescribed time point, and wherein when the number of identified objects in the image data is greater than a preset number, the processor predicts that the communication performance deterioration will occur at the prescribed time point.

11. The robot of claim 10, wherein the processor manages the at least one of the driving wheel or the joint to decelerate at the prescribed time point.

12. The robot of claim 10, wherein respective priorities are determined for the sensors, and at the prescribed time point, the processor collects the data from a first subset of the sensors and not from a second subset of the sensors based on the respective priorities and transmits the collected data from the first subset of the sensors to the server.

13. The robot of claim 12, wherein the processor turns off the second subset of the sensors at the prescribed time point.

14. The robot of claim 10, wherein the processor learns a performance parameter collected during communication with the server, builds a prediction model defining the communication performance over time, and predicts the communication performance for the prescribed time point based on the prediction model.

15. The robot of claim 10, wherein the processor identifies objects from the image data, and when the identified objects satisfy a preset condition, the processor predicts the deterioration of the communication performance, and the preset condition includes at least one of:

the number of the identified objects in the image data being greater than a first preset number, the identified objects in the image data including at least one of a traffic sign, a bridge, or an intersection, or a number of the identified objects with irregular features being greater than a second preset number.

16. The robot of claim 10, wherein the processor performs control so that the at least one of the operation of the robot is accelerated or the operation range is increased after the prescribed time point when the communication performance is predicted to be improved.

17. The robot of claim 10, wherein the processor causes the at least one of the operation of the robot to be decelerated or the operation range of the robot to be reduced at the prescribed time point based on control data received from the server.

18. A server communicating with a robot, the server comprising:

a communication circuit configured to:

receive data from the robot, and transmit, to the robot, future control data for controlling the robot in response to the data; and a processor configured to manage the communication circuit, wherein the processor is further configured to:

receive image data from the robot, identify objects in the image data, predict, based on a number of identified objects, whether communication performance with the robot will deteriorate at a prescribed time point, and when the communication performance with the robot is predicted to deteriorate at the prescribed time point, manage the communication circuit to transmit, to the robot, the future control data causing the robot to at least one of decelerate an operation of the robot or reduce an operation range of the robot at the prescribed time point, wherein the processor is further configured to predict that the communication performance will deteriorate at the prescribed time point when the identified objects satisfy a preset condition, and wherein the preset condition includes that:

the identified objects include at least one of a traffic sign, a bridge, or an intersection, or a number of the identified objects with irregular features is greater than a preset number.

* * * * *